(12) United States Patent
Davis et al.

(10) Patent No.: US 7,336,933 B2
(45) Date of Patent: Feb. 26, 2008

(54) METHOD OF MAINTAINING COMMUNICATION WITH A DEVICE

(75) Inventors: Scott B. Davis, Walworth, WI (US);
Gary L. Christopher, Fox River Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 880 days.

(21) Appl. No.: 10/061,852

(22) Filed: Jan. 31, 2002

(65) Prior Publication Data

US 2003/0143987 A1 Jul. 31, 2003

(51) Int. Cl.
*H04B 1/034* (2006.01)

(52) U.S. Cl. ............... 455/99; 455/417; 455/426.1; 455/557

(58) Field of Classification Search ........... 455/436, 455/437, 438, 439, 440, 441, 442, 443, 444, 455/445, 557, 74.1, 99, 426.1, 414.2, 417
See application file for complete search history.

(56) References Cited

U.S. PATENT DOCUMENTS 4,745,632 A 5/1988 Duffy

| | | | |
|---|---|---|---|
| 5,526,403 A * | 6/1996 | Tam | 455/426.1 |
| 6,032,054 A * | 2/2000 | Schwinke | 455/557 |
| 6,466,784 B1 * | 10/2002 | Cox et al. | 455/414.2 |
| 6,643,523 B2 * | 11/2003 | Goetz | 455/557 |

FOREIGN PATENT DOCUMENTS

| | | |
|---|---|---|
| EP | 0 719 064 A2 | 6/1966 |
| EP | 1 052 863 A2 | 11/2000 |
| WO | WO 97/36442 A1 | 10/1997 |
| WO | WO 00/28762 A1 | 5/2000 |
| WO | WO 01/37520 A2 | 5/2001 |
| WO | WO 01/65867 A2 | 9/2001 |

* cited by examiner

*Primary Examiner*—Gerald Gauthier
(74) *Attorney, Agent, or Firm*—Kevin S. Pickens; Terri S. Hughes

(57) ABSTRACT

The present disclosure is directed to a method of maintaining communication with a device. The method comprises the steps of creating a first communication link between a first wireless communication device associated with a vehicle and the device associated with a predetermined destination number; creating a second communication link between a second wireless communication device and the device associated with the predetermined destination number; and terminating the first communication link in response to the step of creating the second communication link.

38 Claims, 7 Drawing Sheets

METHOD OF MAINTAINING COMMUNICATION WITH A DEVICE

FIELD OF THE INVENTION

The present invention relates to wireless communication systems, and more particularly to a method of maintaining communication with a device.

BACKGROUND OF THE INVENTION

As the deployment of wireless communication network continues to expand, new applications for data and new channels for providing data to individuals continue to evolve. One recent application for the transfer of data can be found in the area of telematics. Telematics is a term generally related to the provisioning of data and/or services to vehicles. Most current telematics systems include a wireless communication device embedded within the vehicle for accessing a telematics service provider. For example, conventional telematics units include a cellular telephone transceiver having hands-free capability to enable communication between the vehicle and a call center associated with telematics service for the vehicle. One advantage of having a cellular telephone transceiver integrated in the telematics system of the vehicle is that a higher power transceiver could be employed within the vehicle. For example, a 3 Watt cellular transceiver could be installed in the vehicle, which provides much greater power than a conventional 0.6 Watt transceiver used in a portable cellular telephone. Such higher power transceivers enable greater access to telecommunication services, for example when in rural areas or where base station coverage is generally weaker.

The vehicle could have a handset coupled to the cellular telephone transceiver, or include a "cradle" which enables communication between a portable wireless communication device and the cellular telephone transceiver of the telematics system. The cradle could enable synchronization between the portable wireless communication device and the telematics system of the vehicle.

However, one problem associated with conventional telematics systems enabling a portable wireless communication device to communicate with a wireless communication of the vehicle is that an individual may be using the portable wireless communication device and may later desire to leave the vehicle and maintain the call using the portable wireless communication device. Alternatively, the user may be in a call using a portable wireless communication device outside the vehicle, and desire to enter the vehicle and maintain a call while driving. Because of the advantages in using the wireless communication device of the vehicle, it may be desirable to transfer the call from the portable wireless communication device to the wireless communication device of the vehicle.

Accordingly, there is a need for a method for maintaining a call when using a portable communication device in a telematics communication system.

DESCRIPTION OF THE PREFERRED EMBODIMENTS

Figure 1:
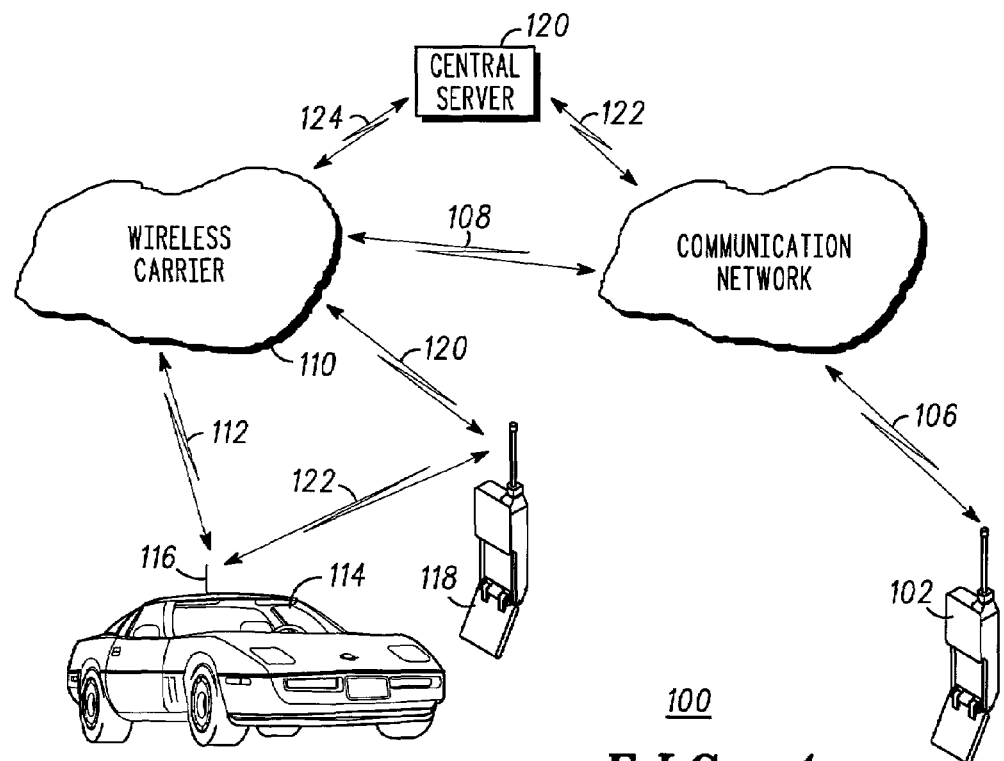
FIG. 1 is a block diagram of a telematics communication system according to the present invention.

Turning first to FIG. 1, a system level diagram of a telecommunication system is shown. In particular, a telecommunication system 100 preferably comprises a communication device 102 which is adapted to communicate with a communication network 104 by way of a communication link 106. The communication device 102 could be any wireless communication device, such as a cellular telephone, a pager, or a personal digital assistant (PDA) having wireless voice capability, or a conventional wire line device, such as a conventional telephone or a computer connected to a wire line network. Similarly, the communication network 104 could be any type of communication network, such as a land line communication network or a wireless communication network, both of which are well known in the art. A communication link 108 enables communication between the communication network 104 and a wireless carrier 110. The communication link 108 could be any type of communication link for processing voice signals, such as any type of signaling protocol used in any conventional landline or wireless communication network. Wireless carrier 110 enables communication with any other telecommunications device, either through wireless communication networks or the public system telephone network (PSTN) as is well known in the art. For example, a wireless communication device could contact any device associated with a destination number by way of the wireless carrier 110.

A communication link 112 enables communication to a wireless communication device 114 of a vehicle 116. The wireless communication device 114 could be, for example, a telematics communication unit installed in the vehicle 116. A telematics communication unit will be described in more detail in reference to FIG. 2. As will be described in more detail in reference to the remaining figures, a portable wireless communication device 118 can communicate separately with the wireless carrier 110 by way of a communication link 119 comprising a wide area connection or with the wireless communication device 114 of the vehicle 116 by way of a communication link 121 comprising a local or short range connection. However, it should be understood that the portable wireless communication device 118 could also communicate with the wireless communication device 114 of the vehicle 116 by way of the wireless carrier 110.

Finally, the communication system 100 of FIG. 1 further includes a central server 120. The central server 120 could be, for example, a telematics service provider having a call processing server operated by employees, and/or a voice recognition system for receiving calls, as is well known in the art. The central server 120 preferably communicates with various elements of the communication network 104 or the wireless carrier 110 by way of a communication link 122 or a communication link 124, respectively.

Figure 2:
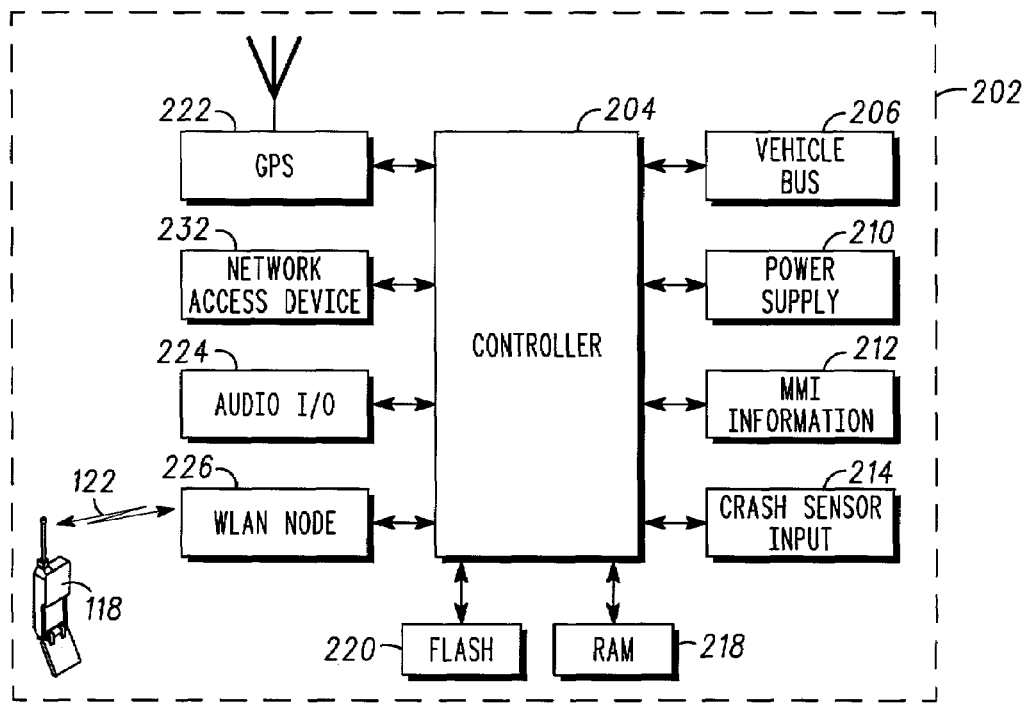
FIG. 2 is a block diagram of a telematics communication unit according to the present invention.

Turning now to FIG. 2, a block diagram of a telematics communication unit 202 according to the present invention which could be installed in the vehicle 116 of FIG. 1 is shown. The telematics communication unit 202 preferably comprises a controller 204 having various input/output (I/O) ports for communicating with various components of a vehicle. For example, the controller 204 is coupled to a vehicle bus 206, a power supply 210, a man machine interface (MMI) 212, and a crash sensor input 214. The connection to the vehicle bus enables operations such as unlocking the door, sounding the horn, flashing the lights, etc. The controller 204 is also preferably coupled to various memory elements, such as a random access memory (RAM) 218 or a flash memory 220. The telematics controller 204 also preferably includes a global positioning system (GPS) unit 222 which provides the location of the vehicle, as is well known in the art. The telematics controller 204 is also preferably coupled to an audio I/O 224 which preferably includes a hands-free system for audio communication for a user of the vehicle by way of a wireless communication network, such as a cellular telephone network. Alternatively, a wired handset could be coupled to the network access device 232.

Finally, the telematics unit 202 could include a wireless local area network (WLAN) node 226 which is also coupled to the telematics controller 204 and enables communication between a WLAN enabled device such as the wireless communication device 118 and the telematics controller 204 by way of the WLAN node 226. The wireless communication device 118 could communicate with the WLAN enabled telematics controller 204, and therefore, a network access device 232, by any WLAN protocol, such as Bluetooth, IEEE 802.11, IrdA, or any other WLAN application, on the communication link 121. The communication link 121 preferably provides a local, low power connection between the portable wireless communication device 118 and the wireless communication device 114 of the vehicle 116. The network access device 232 could be, for example, a cellular telephone transceiver which is well known in the art.

Figure 3:
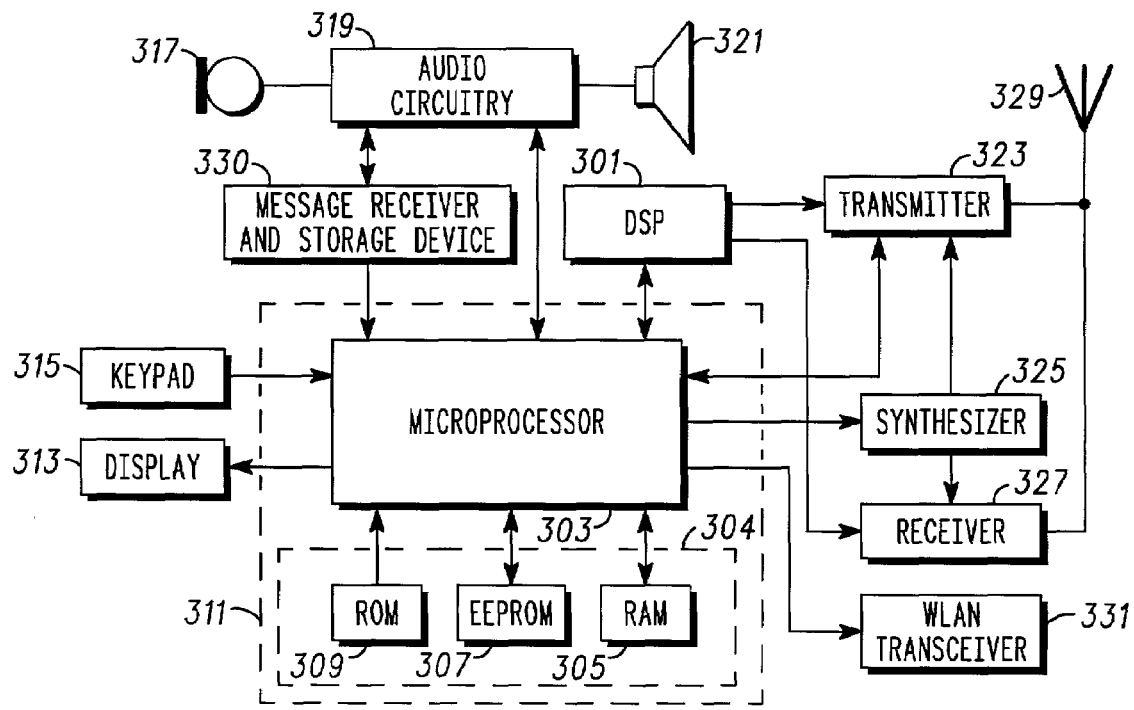
FIG. 3 is a block diagram of a portable wireless communication device according to the present invention.

Turning now to FIG. 3, a block diagram of a wireless communication device such as a cellular radiotelephone according to the present invention is shown. In the preferred embodiment, a frame generator application specific integrated circuit (ASIC) 301, and a microprocessor 303 combine to generate the necessary communication protocol for operating in a cellular system. Microprocessor 303 uses memory 304 comprising RAM 305, EEPROM 307, and ROM 309, preferably consolidated in one package 311, to execute the steps necessary to generate the protocol and to perform other functions for the communication unit, such as writing to a display 313, accepting information from a keypad 315, controlling a frequency synthesizer 325, or performing steps necessary to amplify a signal according to the method of the present invention. ASIC 301 processes audio transformed by audio circuitry 319 from a microphone 317 and to a speaker 321. A transceiver processes the radio frequency signals. In particular, a transmitter 323 transmits through an antenna 329 using carrier frequencies produced by a frequency synthesizer 325. Information received by the communication device's antenna 329 enters receiver 327 which demodulates the symbols comprising the message frame using the carrier frequencies from frequency synthesizer 325. The communication device may optionally include a message receiver and storage device 330 including digital signal processing means. The message receiver and storage device could be, for example, a digital answering machine or a paging receiver. Finally, a WLAN transceiver 331 enables communication with the controller 204, and therefore the network access device 232, by way of the WLAN node 226 of FIG. 2.

Figure 4:
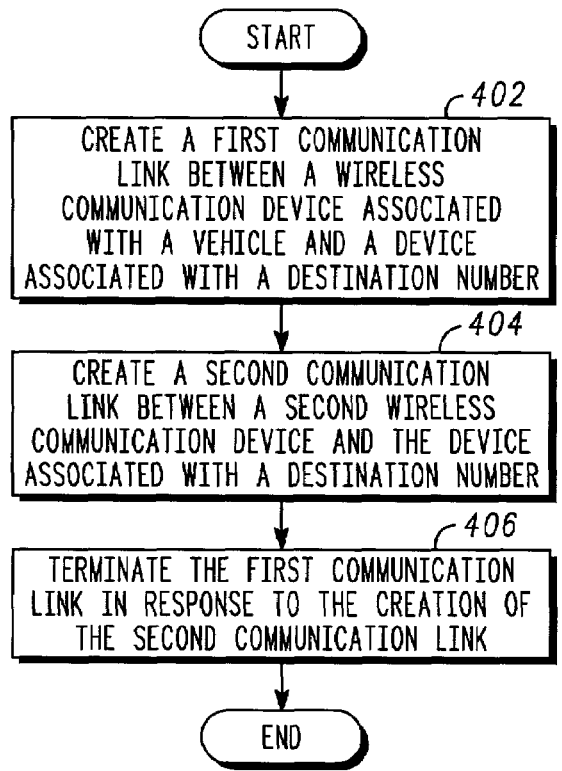
FIG. 4 is a flow chart showing a method for maintaining communication between a portable wireless communication device and a device according to the present invention.

Turning now to FIG. 4, a flow chart shows a method for maintaining communication between a portable wireless communication device and a device according to the present invention. A first communication link is created between a wireless communication device associated with a vehicle and a device associated with a destination number at a step 402. The first communication link could be, for example, the communication link 112. The wireless communication device associated with the vehicle could be, for example, the network access device 232 of the telecommunication unit 202 which is installed in the vehicle 116. The device associated with a destination number could be any communication device, such as a wireless communication device or a landline communication device. A second communication link is created between a second wireless communication device and the device associated with the destination number at a step 404. The second communication link could be, for example, the communication link 119. The second wireless communication device could be, for example, a portable wireless communication device, such as the portable wireless communication device 118 of FIG. 2. The second communication link preferably enables communication with the device associated with the destination number on the same call created by the first communication link.

The first communication link is then terminated in response to the creation of the second communication link at a step 406. The termination could be initiated by the wireless communication device associated with the vehicle, such as by detecting that the portable wireless communication device is out of range of the wireless communication device of the vehicle, or by receiving a command from the portable wireless communication device that the portable wireless communication device desires to terminate the first communication link. Accordingly, an individual using the portable wireless communication device can maintain communication with a device associated with a destination number after the individual (which had previously communicated with the device by way of a wireless communication device of the vehicle) has left the vehicle.

Figure 5:
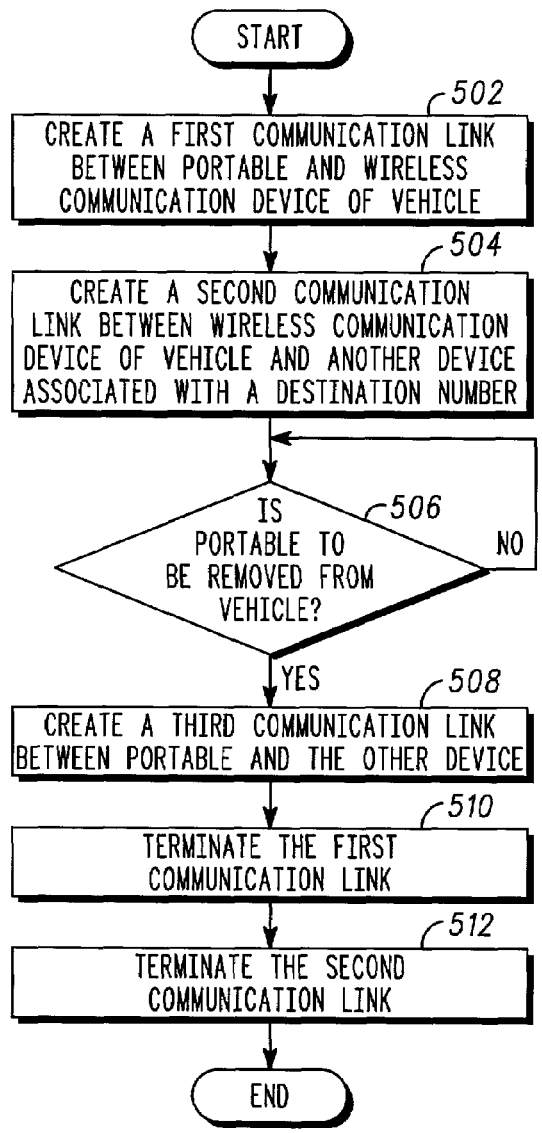
FIG. 5 is a flow chart showing a method for maintaining communication between a portable wireless communication device and a device when the portable wireless communication device is removed from a vehicle according to an alternate embodiment of the present invention.

Turning now to FIG. 5, a flow chart shows a method for maintaining communication between a portable wireless communication device and a device when the portable wireless communication device is removed from a vehicle according to an alternate embodiment of the present invention. A first communication link is created between a portable wireless communication device and a wireless communication device of a vehicle at a step 502. For example, a first communication link could be the communication link 121 between the portable wireless communication device 118 and a network access device 232 which is established by way of the WLAN node 226. The first communication link could enable the transfer of data, such as commands or device parameters, between the portable wireless communication device and the wireless communication device of the vehicle. Alternatively, the communication link could enable the transfer of audio signals between the portable wireless communication device 118 and the wireless communication device 114 of the vehicle 116. For example, the portable wireless communication device could act as a speaker and microphone for the wireless communication device of the vehicle.

A second communication link between the wireless communication device of the vehicle and the device associated with a destination number is established at a step 504. The second communication link could be, for example, the wireless communication link 112 from the network access device 232 to the wireless carrier 110. The wireless carrier 110 would enable communication between the wireless communication device of the vehicle and a device associated with a destination number, such as the communication device 102, by way of wireless or wireline communication networks, as is well known in the art. Also, the first communication link between the portable wireless communication device and the wireless communication device of the vehicle enables the user of the vehicle using the portable wireless communication device to communicate with the device associated with the destination number by way of the wireless communication device of the vehicle. That is, the audio communication on the first communication link between the portable wireless communication device and the wireless communication device of the vehicle could be coupled to the device associated with a destination number on the second communication link.

It is then determined whether the portable wireless communication device 118 is to be removed from the vehicle 116 at a step 506. For example, the wireless communication device 114 of the vehicle 116 could detect that the first communication link has degraded, as determined by a receiver signal strength indication (RSSI), a bit error rate (BER), etc. Alternatively, a user of the portable wireless communication device could provide an indication to the wireless communication device of the vehicle by selecting a predetermined code or button on the keypad of the portable wireless communication device. If the portable wireless communication device 118 is to be removed from the vehicle 116 at the step 506, a third communication link is created between the portable wireless communication device 118 and the device associated with a destination number at a step 508. The third communication link could be, for example, the communication link 119, and would be coupled to the existing call existing on the second communication link.

The first communication link is then terminated at a step 510. The second communication link is then terminated at a step 512. The second communication link could be terminated by the wireless communication device of the vehicle in response to a signal received from the portable wireless communication device before the first communication link was terminated, or in response to the termination of the first communication link at step 510. Accordingly, the user of a vehicle which was in communication with the device associated with a destination number at step 504 can continue the call uninterrupted by way of the third communication link established at the step 508.

Figure 6:
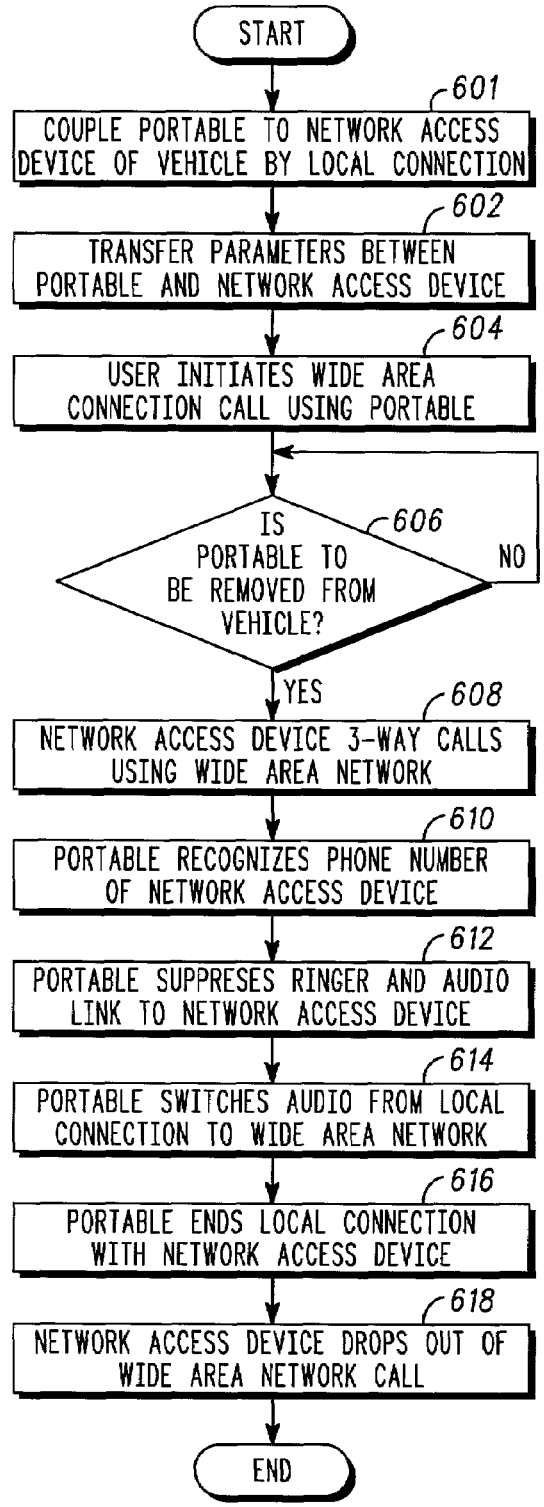
FIG. 6 is a flow chart showing a method for maintaining communication between a portable wireless communication device and a device by way of a three-way call when the portable wireless communication device is removed from a vehicle.

Turning now to FIG. 6, a flow chart shows a method for maintaining communication between a portable wireless communication device and a device by way of a three-way call when the portable wireless communication device is removed from a vehicle. A portable wireless communication device is coupled to a network access device of a vehicle by a local connection at a step 601. Such a coupling could be, for example, the coupling of the portable wireless communication device 118 to the network access device 232 by way of the wireless communication link 121. Parameters are then transferred between the portable wireless communication device and the network access device at a step 602. The parameters could be, for example, unique identifiers for the devices, such as an electronic serial number (ESN) or vehicle identification number (VIN), a destination number assigned to the device, etc.

A user then creates a second communication link by initiating a wide area connection call to the device at a destination number using the portable wireless communication device at a step 604. In particular, the portable wireless communication device directs the network access device to initiate a call on a wide area network. For example, portable wireless communication device 118 could direct the wireless communication device 114 of the vehicle 116 (by way of the communication link 121) to call the device at the destination number (by way of the communication link 112). The audio for the call is then coupled from the network access device to the portable wireless communication device 118 by way of the first communication link. Alternatively, the audio could be coupled to a hands-free speaker system associated with the network access device 232.

It is then determined whether the portable is to be removed from the vehicle at a step 606. The removal of the portable wireless communication device could be detected passively, such as by a change in signal strength detected at either the portable wireless communication device or the wireless communication device of the vehicle. Alternatively, the removal of the portable wireless communication device could be signaled by a user of the portable wireless communication device, for example, by selecting a code or a dedicated button on either the portable wireless communication device or the wireless communication of the vehicle. If the device is to be removed, the network access device creates a third communication link by initiating a "three-way call" to the portable using the wide area network at a step 608. The network access device is able to call the portable wireless communication device using parameters transferred between the devices at the step 602. Similarly, the portable is able to recognize the phone number of the network access device at a step 610 based upon the parameters that are transferred between the devices. Because the portable wireless communication device is communicating with the network access device of the vehicle on the first communication link, the portable can suppress the ringer and audio link to the network access device at a step 612. That is, the portable wireless communication device can either receive a message from the network access device to suppress the ringer and audio link, or can automatically suppress the ringer and audio link knowing that the call is being made to enable a three-way call.

The portable wireless communication device then switches the audio from the first communication link to the local connection to the third communication link at a step 614. That is, after accepting the call from the network access device which enables the three-way connection to the device at a predetermined destination number, the portable wireless communication device communicates with the device at the destination number by way of the third communication link (i.e., by the connection on the wide area network). The portable wireless communication device then ends the first communication link with the network access device at a step 616. Alternatively, the first communication link could be terminated by the portable wireless communication device eventually being out of range of the network access device. The network access device then drops the second communication link at a step 618.

Figure 7:
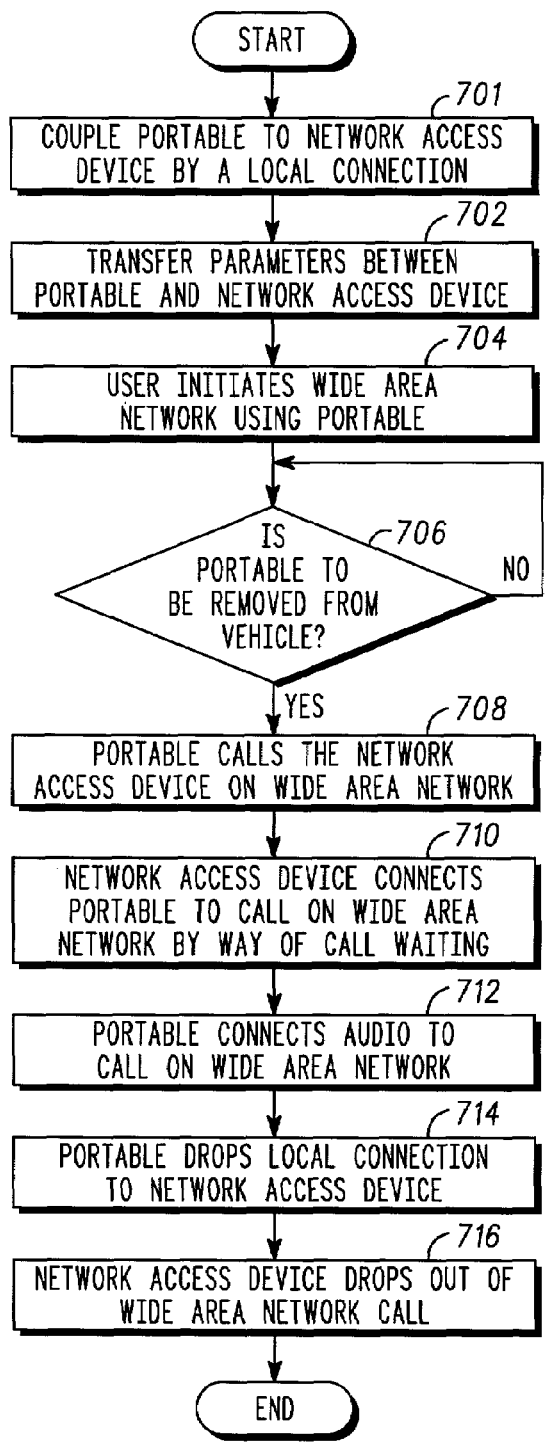
FIG. 7 is a flow chart showing a method for maintaining a call between a portable wireless communication device and a device by way of call waiting when the portable is removed from the vehicle.

Turning now to FIG. 7, a flow chart shows a flow chart showing a method for maintaining a call between a portable wireless communication device and a device by way of call waiting when the portable is removed from the vehicle. A first communication link is established when a portable wireless communication device is coupled to a network access device by a local connection at a step 701. Such a coupling could be, for example, the coupling of the portable wireless communication device 118 to the network access device 232 by way of the wireless communication link 121 and the WLAN node 226. Parameters are then transferred between the portable wireless communication device and the network access device at a step 702. The user then creates a second communication link by initiating a wide area network call using the portable wireless communication device at a step 704. That is, the user, using the portable wireless communication device, directs a network access device to initiate a wide area network call.

It is then determined as described earlier if the portable wireless communication device is to be removed from the vehicle at a step 706. If the portable wireless communication device is to be removed, the portable creates a third communication link by calling the network access device on the wide area network at a step 708. The network access device connects the portable wireless communication device to the existing call on the wide area network by way of call waiting at a step 710. That is, the portable wireless communication device is coupled to the existing call between the network access device and the device at a destination number. The portable wireless communication device then connects the audio to the third communication link on the wide area network at a step 712. The portable then drops the first communication link, thereby disconnecting the local this connection to the network access device at a step 714. Finally, the network access device drops out of the call on the wide area network at a step 716, leaving the portable wireless communication device and the device associated with the destination number on the call.

Preferably, the software in the switch is modified to enable a party to drop out of the call leaving the remaining parties, even if the party dropping out of the call generated the connection between the devices. For example, in the case of a three-way call, if the initial party ends its call to the second party after initiating a three-way call to a third party, the software in the switch could enable the link between the second and the third phone to remain. For example, different key codes could be used to enable the call to remain active between the second and third parties. In a cellular communication network, the calling party could enter the third party's number and select the send (SND) button. Upon pressing SND, the first party would be put on hold and a connection would be made to the second party. The user could then press a predetermined key, such as three, and then SND to connect all three parties once the third party has answered. Finally, the user could then press another key, such as four and then SND to disconnect from the call and leave the second and third parties connected. Although such a calling sequence would put a caller on hold for a predetermined time, such a holding time could be eliminated or minimized. For example, the software in the switch could be modified to set up the third party to a virtual fourth party (termination only in the switch). Then when the call is set up, the third party could be tied into the original call without having to put the first or second party on hold.

Figure 8:
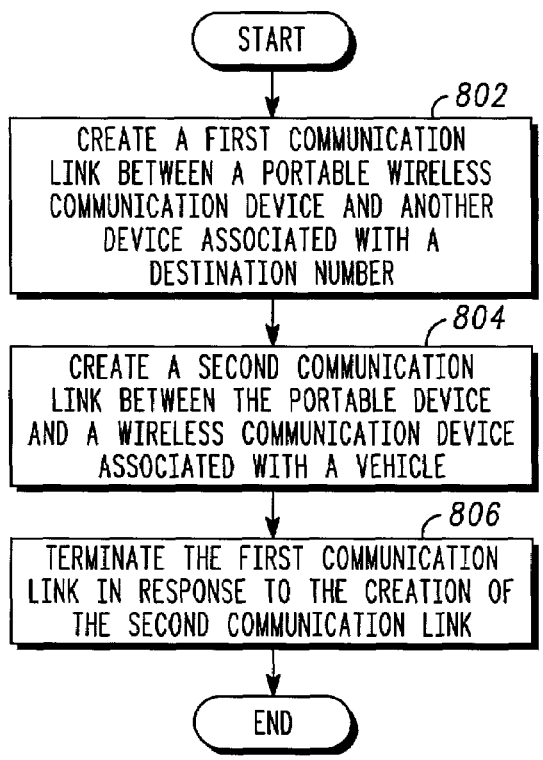
FIG. 8 is a flow chart showing a method for maintaining communication between a portable wireless communication device and a device according to an alternate embodiment of the present invention.

Turning now to FIGS. 8-11, methods are described for maintaining communication with a device when a portable wireless communication device comes within range of a wireless communication device of a vehicle. Turning first to FIG. 8, a flow chart shows a method for maintaining communication between a portable wireless communication device and a device according to an alternate embodiment of the present invention. A first communication link is created between a portable wireless communication device and another device associated with a destination number at a step 802. The first communication link could be, for example, the communication link 119 between the communication device 118 and the wireless carrier 110. The wireless carrier 110 enables the connection to the device associated with a destination number.

A second communication link is then created between the portable wireless communication device and a wireless communication device associated with a vehicle at a step 804. The second communication link could be established when the portable wireless communication device 118 comes within range of the vehicle 116, for example. In particular, the link could be similar to the wireless communication link 121 which connects the portable wireless communication device 118 to the network access device 232 by way of the WLAN node 226 and the controller 204 in FIG. 2. The second communication link preferably enables the user of the portable wireless communication device to communicate with the device associated with a destination number by way of a wireless communication device associated with the vehicle. Finally, the first communication link is terminated in response to the creation of the second communication link at a step 806.

Figure 9:
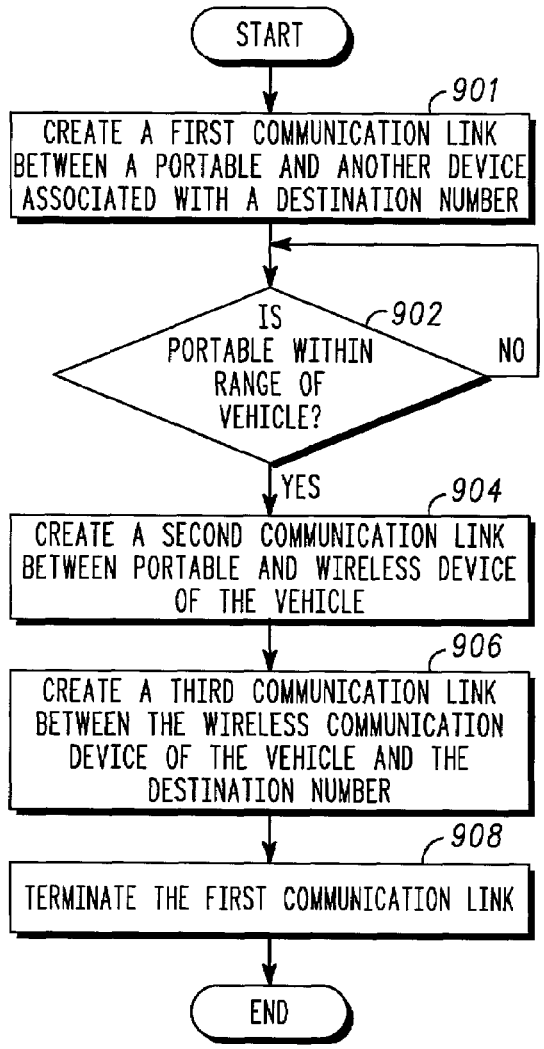
FIG. 9 is a flow chart showing a method for maintaining communication between a portable and another device entering a vehicle according to an alternate embodiment of the present invention.

Turning now to FIG. 9, a flow chart shows a method for maintaining communication between a portable and another device entering a vehicle according to an alternate embodiment of the present invention. A first wireless communication link is created between a portable wireless communication device and a device associated with a destination number at a step 901. The portable wireless communication device could be, for example, the portable wireless communication device 118 which is capable of communicating with the network access device 232 by way of a WLAN node 226. It is then determined, either by the portable wireless communication device or by the wireless communication device of the vehicle, whether the portable wireless communication device is within range of the vehicle at a step 902. For example, the portable wireless communication device could periodically send a signal requesting a connection to a WLAN node of a vehicle, or the WLAN node of the vehicle could periodically signal the portable wireless communication device. Alternatively, as user of the portable wireless communication device becomes close to a vehicle, the user could initiate a connection to the vehicle.

A third communication link is then created between the wireless communication device of the vehicle and the device at the destination number at a step 906. Preferably, the portable wireless communication device could send a command to the wireless communication device of the vehicle by way of the second communication link to create the third communication link. After the third communication link is created, the first communication link is terminated at a step 908. Because the second communication link enables the transfer of audio between the portable wireless communication device and the wireless communication device of the vehicle, the user of the portable wireless communication device can maintain the call with the device associated with the destination number by way of the wireless communication device of the vehicle. By communicating with the device associated with the destination number by way of the communication device of the vehicle, the user may have a better connection because of a higher power transceiver used in the wireless communication device of the vehicle compared to the portable wireless communication device, or the ability to change to a hands-free system associated with the wireless communication device of the vehicle.

Figure 10:
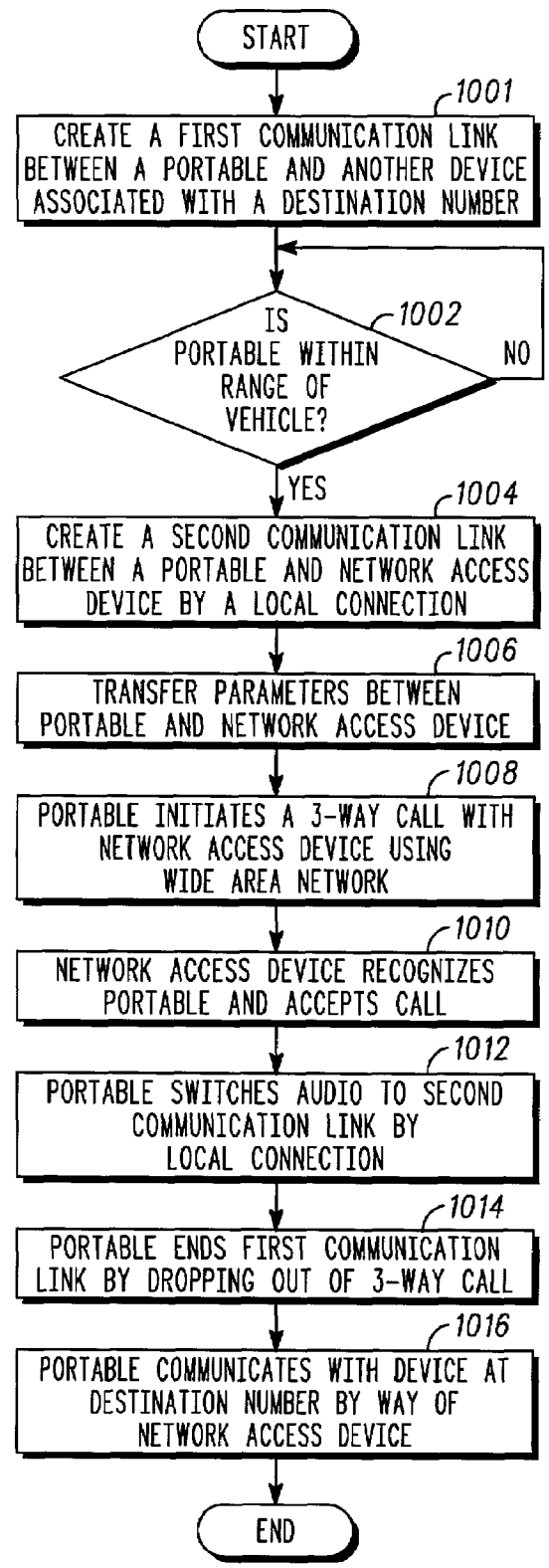
FIG. 10 is a flow chart showing a method for maintaining communication between a portable and a device by way of a three-way call when the device enters the vehicle according to an alternate embodiment of the present invention.

Turning now to FIG. 10, a flow chart shows a method for maintaining communication between a portable wireless communication device and another device by way of a three-way call when the device enters the vehicle according to an alternate embodiment of the present invention. A first communication link is created between a portable wireless communication device and another device associated with a destination number at a step 1001. It is then determined whether the portable wireless communication device is within range of a vehicle at a step 1002. If the portable wireless communication device is within range, a second communication link is created between the portable wireless communication device and a network access device by way of a wireless communication device of the vehicle, such as WLAN node 226, by a local connection at a step 1004. Parameters are then transferred between the portable wireless communication device and the network access device at a step 1006.

The portable wireless communication device creates a third communication link by initiating a three-way call with the network access device using a wide area network at a step 1008. Because the parameters were exchanged between the devices, the network access device recognizes the portable wireless communication device and accepts the call at a step 1010. By linking the network access device to the call, the network access device can then communicate with the device associated with a destination number. Because the second communication link exists, the portable wireless communication device can switch its audio to the second communication link at a step 1010. Accordingly, the portable wireless communication device can now communicate with the device associated with the destination number by way of the third communication link which links the network access device to the device associated with a destination number. The portable wireless communication device then ends the first communication link by dropping out of the three-way call at a step 1014, and communicates with the device at the destination number by way of the network access device at a step 1016.

Figure 11:
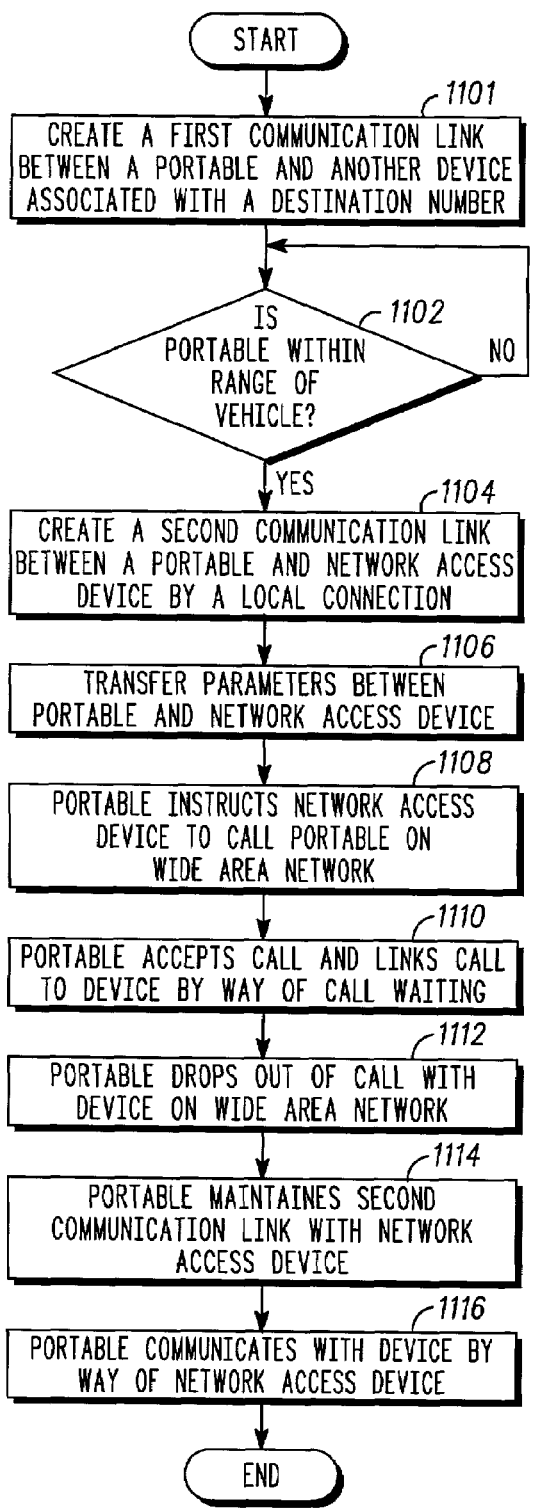
FIG. 11 is a flow chart showing a method for maintaining communication between a portable and a device by way of call waiting when a portable enters a vehicle according to an alternate embodiment of the present invention.

Turning now to FIG. 11, a flow chart shows a method for maintaining communication between a portable wireless communication device and a device by way of call waiting when a portable wireless communication device enters a vehicle according to an alternate embodiment of the present invention. A first communication link is created between the portable wireless communication device and a device associated with a destination number at a step 1101. It is then determined whether the portable wireless communication device is within range of a vehicle at a step 1102. A second communication link is created between the portable wireless communication device and the network access device by a local connection at a step 1104. Parameters are then transferred between the portable wireless communication device and the network access device at a step 1106.

The portable wireless communication device then instructs the network access device to call the portable wireless communication device on a wide area network at a step 1108. The portable wireless communication device accepts the call and links the network access device to the device associated with a destination number by way of call waiting at a step 1110. Accordingly, a third communication link between the portable wireless communication device and the network access device on the wide area network enables the network access device to communicate with the device associated with the destination number. The portable wireless communication device then drops out of the call with the device associated with the destination number at a step 1112. However, the portable wireless communication device maintains the second communication link with the network access device at step 1114, and therefore communicates with the device associated with the destination number by way of the network access device at a step 1116. Accordingly, because the second communication link comprising a local connection between the portable wireless communication device and the network access device exists, the user can use the portable wireless communication device to communicate with the device at the destination number on a wide area network by way of the network access device.

Figure 12:
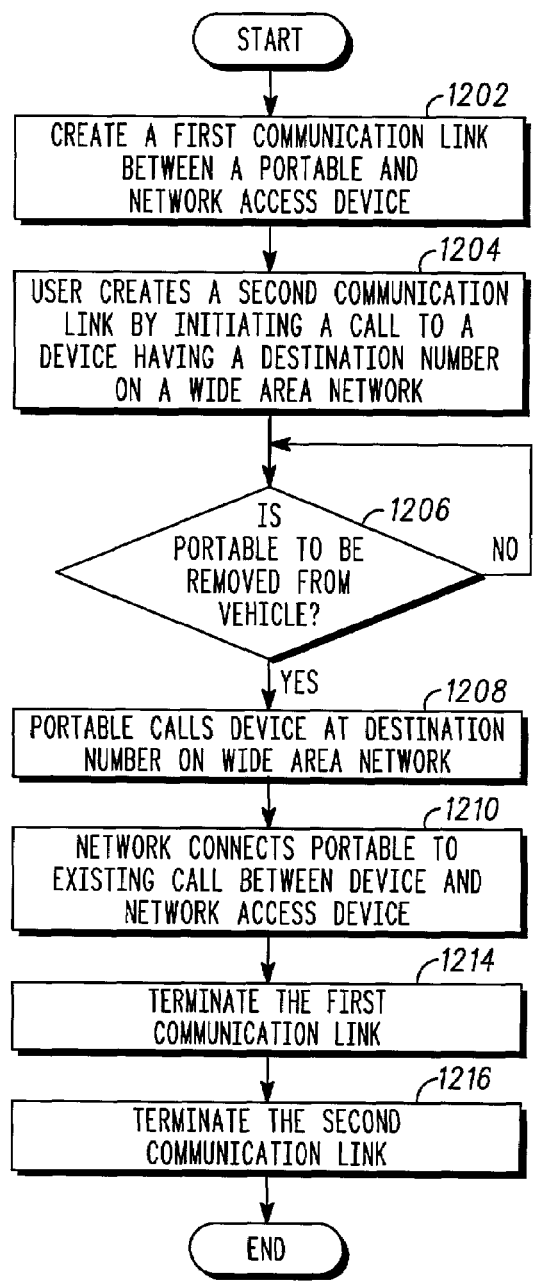
FIG. 12 is a flow chart showing a method for maintaining communication between a portable and a device when the portable is removed from a vehicle according to a further alternate embodiment of the present invention.

Turning now to FIG. 12, a flow chart shows a method for maintaining communication between a portable wireless communication device and a device when the portable wireless communication device is removed from a vehicle according to a further alternate embodiment of the present invention. A first communication link between a portable wireless communication device and a wireless communication device of a vehicle, such as the network access device 232, is created at a step 1202. The user then creates a second communication link by initiating a call to a device having a destination number on a wide area network at a step 1204. In particular, the user, by way of the portable wireless communication device commands the network access device of the vehicle on the first communication link to initiate a call to the device having a destination number on the second communication link on a wide area network, such as a cellular telephone network.

It is then determined whether the portable wireless communication device is to be removed from the vehicle at a step 1206. If the portable wireless communication device is to be removed, the portable wireless communication device calls the device at the destination number on a wide area network at a step 1208. The network then connects the portable wireless communication device to the existing call between the device and the network access device at a step

1210. That is, the network could be configured in such a way to recognize that the call from the portable wireless communication device is intended to create a three-way call. For example, a special signal could be sent to the wide area network (from either the portable wireless communication device or the wireless communication device of the vehicle) requesting a three-way call, or the network could determine, based upon the call status or the relative location of the devices, that a three-way call is desired. Alternatively, the network could detect that the portable wireless communication device is attempting to call a destination number to which the wireless communication device is already connected, indicating that a three-way call is desired. According to a further alternative, the network could use a conversation correlation function at the telephone switch to be used in conjunction with the phone system's call waiting feature. The first communication link is then terminated at a step 1214, and a second communication link is then terminated at a step 1216. Accordingly, the network enables the separate connection of the portable wireless communication device to the device at the destination number on the wide area network, and enables that communication link to be maintained even after the second communication link between the network access device and the device at the destination number is terminated. The creation and termination of any communication link is preferably performed automatically, and without any awareness by the users of the devices.

Figure 13:
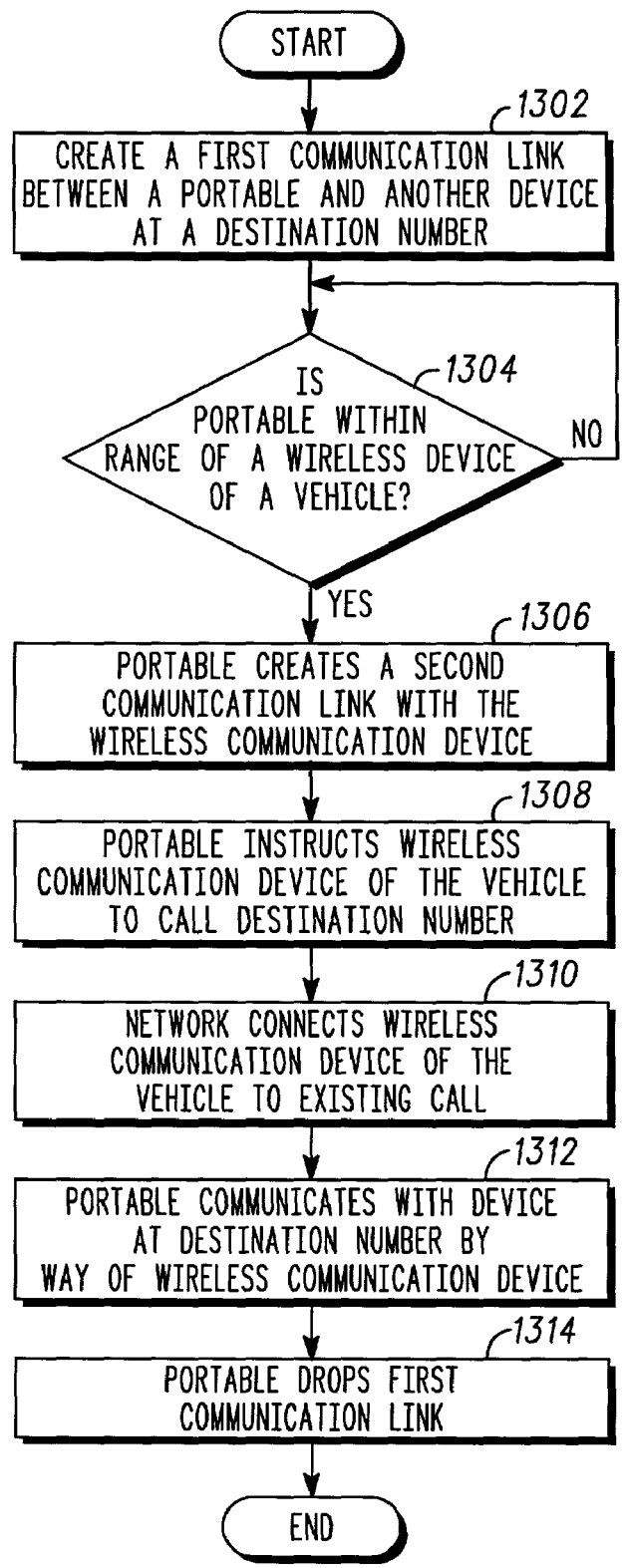
FIG. 13 is a flow chart showing a method for maintaining communication between a portable and a device when the portable enters a vehicle according to a further alternate embodiment of the present invention.

Finally, turning now to FIG. 13, a flow chart showing a method for maintaining communication between a portable wireless communication device and a device when the portable wireless communication device enters a vehicle according to a further alternate embodiment of the present invention. A first communication link is created between a portable wireless communication device and a device at a destination number on a wide area network at a step 1302. It is then determined whether the portable wireless communication device is within range of a wireless device of a vehicle at a step 1304. If the portable wireless communication device is within range, a second communication link is created between the portable wireless communication device and the wireless communication device of the vehicle on a local connection at a step 1306. The portable wireless communication device then instructs the wireless communication device of the vehicle to create a third communication link by calling the destination number on the wide area number at a step 1308. (Alternatively, the wireless communication device of the vehicle could then call a portable wireless communication device on the wide area network.) The wide area network then automatically connects the wireless communication device of the vehicle to the existing call without any interruption at a step 1310. For example, the network could detect a three-way call is desired in the same ways as described in reference to FIG. 12. The portable wireless communication device then communicates with the device at the destination number by way of the wireless communication device of the vehicle at a step 1312. The portable wireless communication device then drops the first communication link at a step 1314.

It can therefore be appreciated that a new and novel method of maintaining a call on a wireless communication device has been described. It will be appreciated by those skilled in the art that, given the teaching herein, numerous alternatives and equivalent will be seen to exist which incorporate the disclosed invention. As a result, the invention is not to be limited by the foregoing exemplary embodiments, but only by the following claims.

We claim:

1. A method maintaining communication with a device associated with a destination number, said method comprising the steps of:
    creating a first communication link between a first wireless communication device in a vehicle and a second wireless communication device;
    creating a second communication link between said first wireless communication device and said device associated with said destination number;
    enabling communication between said second wireless communication device and said device associated with said destination number on a wide area network by way of said first wireless communication device;
    creating a third communication link between said second wireless communication device and said device associated with said destination number on said wide area network by way of a three-way call;
    detecting a degradation in said first communication link; and
    terminating said first communication link and said second communication link.

2. The method of claim 1 wherein said first wireless communication device is a telematics communication device.

3. The method of claim 1 wherein said step of creating said first communication link between said first wireless communication device and said second wireless communication device comprises physically coupling said first wireless communication device to said second wireless communication device.

4. The method of claim 1 wherein said step of creating said first communication link between said first wireless communication device and said second wireless communication device comprises wirelessly coupling said first wireless communication device to said second wireless communication device.

5. The method of claim 1 wherein said step of creating said third communication link comprises said first wireless communication device initiating said three-way call with said device associated with said destination number and said second wireless communication device on said wide area network.

6. The method of claim 1 wherein said second wireless communication device is a cellular telephone.

7. The method of claim 1 further comprising a step of transferring parameters between said first wireless communication device in said vehicle and said second wireless communication device.

8. The method of claim 1 wherein said second wireless communication device is portable.

9. The method of claim 1 wherein said second communication link is created when said second wireless communication device directs said first wireless communication device on said first communication link to initiate a call on said wide area network to said device associated with said destination number.

10. A method maintaining communication with a device associated with a destination number, said method comprising the steps of:
    creating a first communication link between a first wireless communication device in a vehicle and a second wireless communication device;
    creating a second communication link between said first wireless communication device and said device associated with said destination number;

enabling communication between said second wireless communication device and said device associated with said destination number on a wide area network by way of said first wireless communication device;

creating a third communication link between said second wireless communication device and said device at said destination number on said wide area network by way of a call waiting; and terminating said first communication link and said second communication link, wherein said step of creating a third communication link comprises said second wireless communication device making a call to said first wireless communication device in a vehicle on said wide area communication network.

11. The method of claim 10 wherein said first wireless communication device in said vehicle is a telematics communication device and said second wireless communication device is a cellular telephone.

12. The method of claim 10 wherein said step of creating said first communication link between said first wireless communication device in said vehicle and said second wireless communication device comprises physically coupling said first wireless communication device to said second wireless communication device.

13. The method of claim 10 wherein said step of creating said first communication link between said first wireless communication device in said vehicle and said second wireless communication device comprises wirelessly coupling said first wireless communication device to said second wireless communication device.

14. The method of claim 10 wherein said step of creating a third communication link further comprises a step of said first wireless communication device accepting said call.

15. The method of claim 10 further comprising a step of transferring parameters between said first wireless communication device and said second wireless communication device.

16. The method of claim 10 further comprising a step of detecting a degradation in said first communication link prior to performing said step of terminating said first communication link and said second communication link.

17. The method of claim 10 wherein said second wireless communication device is portable.

18. A method maintaining communication with a device associated with said destination number, said method comprising the steps of:

creating a first communication link between a first wireless communication device in a vehicle and a second wireless communication device;

creating a second communication link between said first wireless communication device and said device associated with said destination number;

enabling communication between said second wireless communication device and said device associated with said destination number on a wide area network by way of said first wireless communication device;

creating a third communication link between said second wireless communication device and said device at said destination number by way of said wide area network by way of a call waiting;

detecting a degradation in said first communication link; and terminating said first communication link and said second communication link.

19. The method of claim 18 wherein said step of creating said first communication link between said first wireless communication device in said vehicle and said second wireless communication device comprises physically coupling said first wireless communication device in said vehicle to said second wireless communication device.

20. The method of claim 18 wherein said step of creating said first communication link between said first wireless communication device in said vehicle and said second wireless communication device comprises wirelessly coupling said first wireless communication device in said vehicle to said second wireless communication device.

21. The method of claim 18 wherein said first wireless communication device is a telematics communication device.

22. The method of claim 18 wherein said second wireless communication device is a cellular telephone.

23. The method of claim 18 wherein said second wireless communication device is portable.

24. The method of claim 18 further comprising a step of transferring parameters between said first wireless communication device and said second wireless communication device.

25. A method maintaining communication with a device associated with a destination number, said method comprising the steps of:

creating a first communication link between a first wireless communication device and said device associated with said destination number;

creating a second communication link between said first wireless communication device and a second wireless communication device in a vehicle;

enabling communication between said second wireless communication device and said device associated with said destination number on a wide area network by way of said first wireless communication device;

creating a third communication link between said second wireless communication device and said device associated with said destination number on said wide area network by way of a three-way call; and terminating said first communication link.

26. The method of claim 25 wherein said first wireless communication device is a cellular telephone.

27. The method of claim 25 wherein said second wireless communication device is a telematics communication device.

28. The method of claim 25 wherein said step of creating said second communication link between said first wireless communication device and said second wireless communication device comprises physically coupling said first wireless communication device to said second wireless communication device.

29. The method of claim 25 wherein said step of creating said second communication link between said first wireless communication device and said second wireless communication device comprises wirelessly coupling said first wireless communication device to said second wireless communication device.

30. The method of claim 25 wherein said step of creating said third communication link comprises said first wireless communication device initiating said three-way call with said device associated with said destination number and said second wireless communication device on said wide area network.

31. The method of claim 25 further comprising a step of transferring parameters between said first wireless communication device and said second wireless communication device.

32. A method maintaining communication with a device associated with a destination number, said method comprising the steps of:
- creating a first communication link between a first wireless communication device and said device associated with said destination number;
- creating a second communication link between said first wireless communication device and a second wireless communication device in a vehicle;
- enabling communication between said second wireless communication device and said device associated with said destination number on a wide area network by way of said first wireless communication device;
- creating a third communication link between said second wireless communication device and said device at said destination number on said wide area network by way of a call waiting; and
- terminating said first communication link,
- wherein said step of creating a third communication link comprises said second wireless communication device in said vehicle making a call to said first wireless communication device on said wide area communication network.

33. The method of claim 32 wherein said first wireless communication device is a cellular telephone.

34. The method of claim 32 wherein said second wireless communication device is a telematics communication device.

35. The method of claim 32 wherein said step of creating said second communication link between said first wireless communication device and said second wireless communication device comprises physically coupling said first wireless communication device to said second wireless communication device.

36. The method of claim 32 wherein said step of creating said second communication link between said first wireless communication device and said second wireless communication device comprises wirelessly coupling said first wireless communication device to said second wireless communication device.

37. The method of claim 32 wherein said step of creating said third communication link further comprises a step of said first wireless communication device accepting said call.

38. The method of claim 32 further comprising a step of transferring parameters between said first wireless communication device and said second wireless communication device.

* * * * *